March 28, 1950     J. B. HOWELL     2,501,902
EDUCATIONAL TOY
Filed Dec. 1, 1947     4 Sheets-Sheet 1
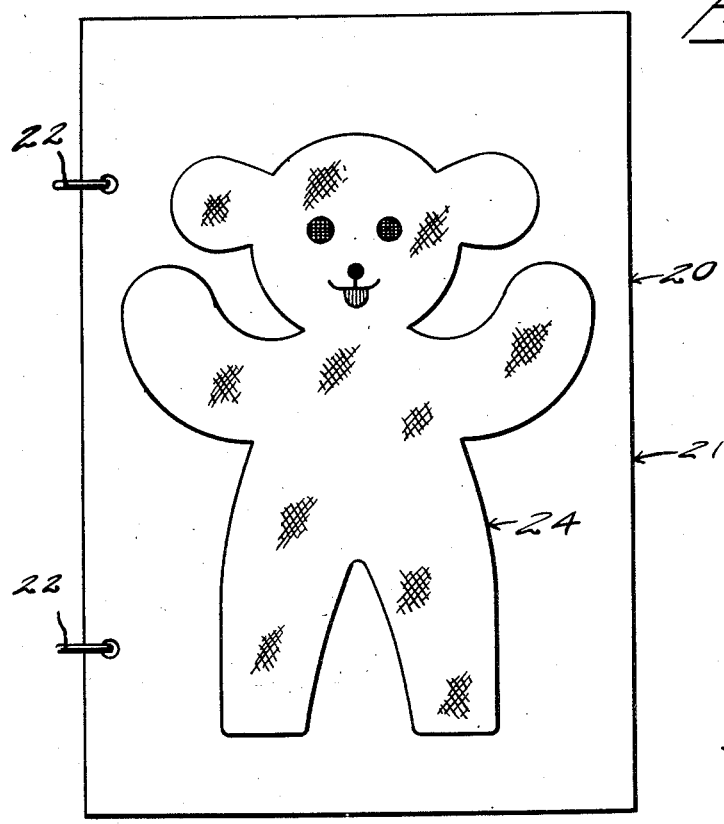
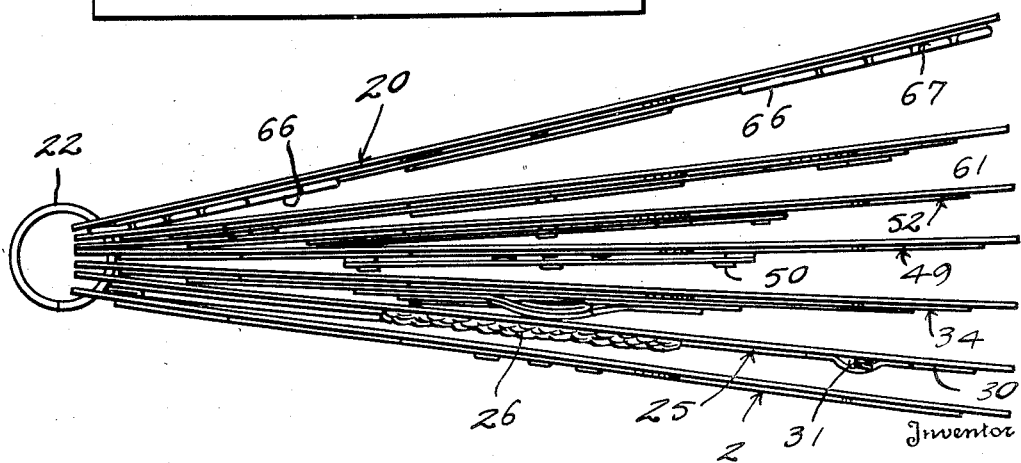
Inventor
Judy B. Howell
By
Kimmel & Crowell Attys.

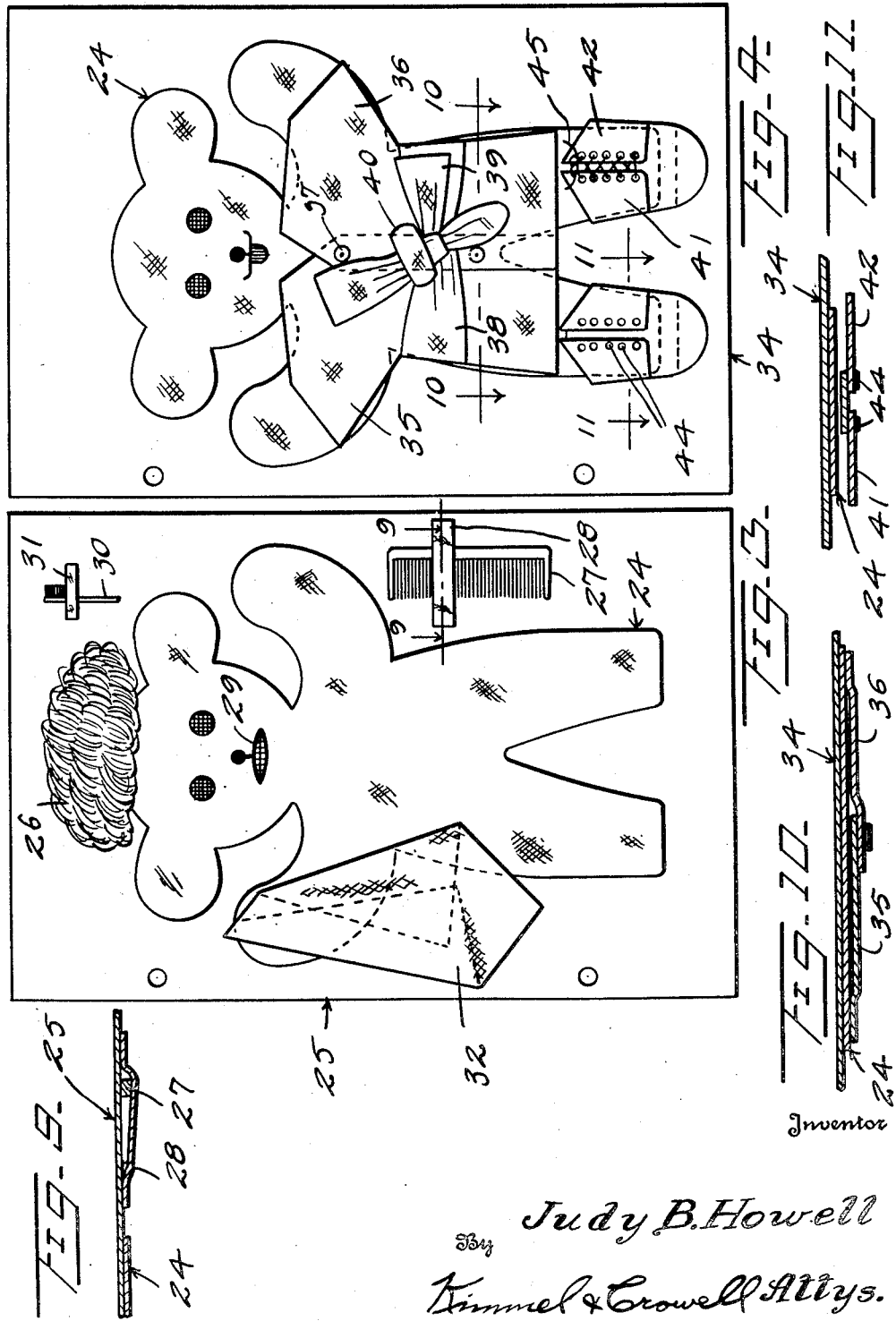

March 28, 1950     J. B. HOWELL     2,501,902
EDUCATIONAL TOY
Filed Dec. 1, 1947     4 Sheets-Sheet 3
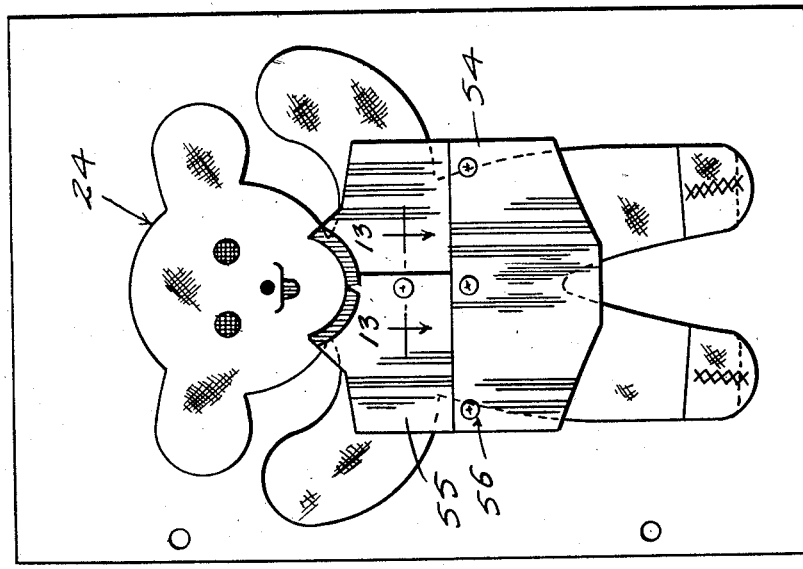
Inventor
Judy B. Howell
By Kimmel & Crowell Attys.

March 28, 1950     J. B. HOWELL     2,501,902
EDUCATIONAL TOY
Filed Dec. 1, 1947     4 Sheets-Sheet 4
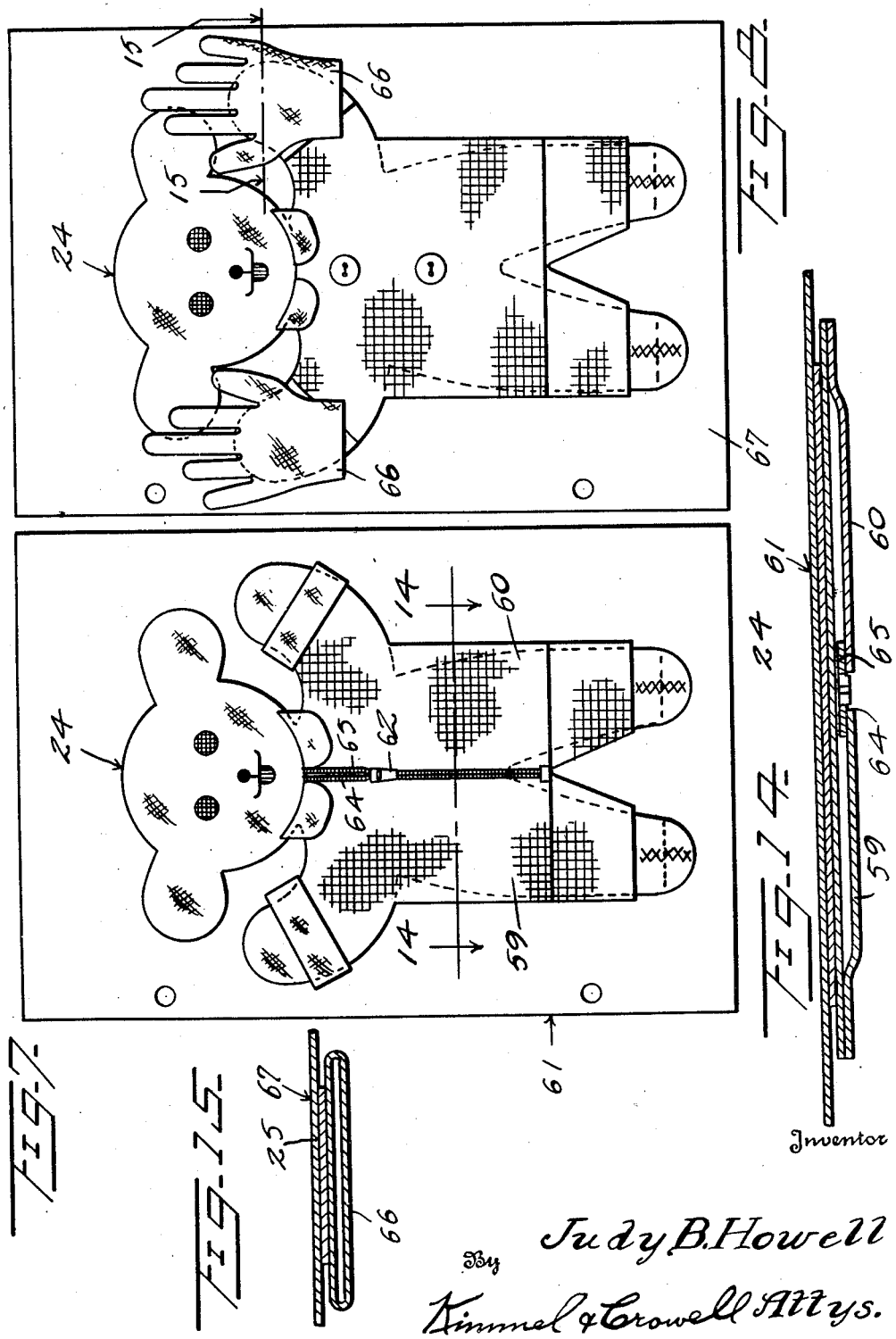
Inventor
Judy B. Howell
By Kimmel & Crowell Attys.

Patented Mar. 28, 1950

2,501,902

UNITED STATES PATENT OFFICE 2,501,902

EDUCATIONAL TOY

Judy Bellamy Howell, Mount Sterling, Ky.

Application December 1, 1947, Serial No. 789,063

6 Claims. (Cl. 35—28)

This invention relates to toys and more particularly to educational toys in book form.

It is an object of this invention to provide an educational toy of the kind described, for teaching a child the various processes of securing together articles of clothing in the various manners conventionally applied.

Another object of this invention is to provide an educational toy of the kind to be more particularly described hereinafter, having substantially rigid sheets and having on each sheet an animated figure. Each separate sheet will embody the figure in the various stages of dress, wherein the specific articles depicted will be complete to the extent that the securing means therefor, such as buttons, bows, zippers, etc., will be operative by the student or instructor for actually providing illustrative examples of the various stages of dress and the various means of securing each separate article about the body.

A further object of this invention is to provide an educational toy of this kind wherein each successive page of the book exemplifies the figure thereon in a progressive stage of dressing whereby the bare figure of the first page is shown on succeeding pages in a progressive stage of dress until the completely dressed figure is shown on the last page, thus enabling instruction of the child in the progressive stages of dress.

Yet another object of this invention is to provide a book of this kind which includes a page having supported thereon the several combs and brushes required for dressing, together with the stages of applying clothing to the body.

A still further object of this invention is to provide an educational toy of this kind in which the various articles of clothing may be variantly colored to further enhance the attractiveness of the device as a toy, together with the educational advantages which may be derived.

With the above and other objects in view, my invention consists in the arrangement, combination and details of construction disclosed in the drawings and specification, and then more particularly pointed out in the appended claims.

In the drawings,

Figure 1 is a front elevation of the front sheet of an educational book or toy constructed according to an embodiment of this invention, Figure 2 is a top plan view of the book, Figure 3 is a front elevation of the second page of the book, Figure 4 is a front elevation of the third page, showing the figure partially dressed, Figure 5 is a front elevation of the fourth page of the book, Figure 6 is a front elevation of the fifth page of the book, Figure 7 is a front elevation of the sixth page of the book, showing the figure fully dressed, Figure 8 is a front elevation of the seventh page of the book, showing the use of gloves with the figure, and clothing, Figure 9 is a section taken on the line 9—9 of Figure 3, Figure 10 is a horizontal section taken on the line 10—10 of Figure 4, Figure 11 is a horizontal section taken on the line 11—11 of Figure 4, Figure 12 is a section taken on the line 12—12 of Figure 5, Figure 13 is a section taken on the line 13—13 of Figure 6, Figure 14 is a horizontal section taken on the line 14—14 of Figure 7, Figure 15 is a horizontal section taken on the line 15—15 of Figure 8.

Referring to the drawings, the numeral 20 designates generally an improved educational toy in book form for teaching to children the operation of the various fastening means used in clothing for the various articles of clothing used in conventional dress. The book 20 is formed with a plurality of loose-leaf pages hingedly connected together by rings 22 engaging through openings or holes along one edge of each of the pages.

The pages 21 are arranged so that a figure picturized on each of the pages will be shown in the various stages of dress on consecutive pages. The pages 21 may be made of cardboard or plastic or other suitable material which will provide a substantially rigid background for each of the figures, and having the desired resiliency for the easy handling of the book.

On certain of the pages, rather than show the various stages of dress, there is shown the conventional comb and toothbrush which are used in dressing, for teaching the child the use of these tools.

In Figure 1 there is shown the first page of the book having mounted on one side thereof a fabric figure 24 in the shape of a bear or other suitably attractive figure. The figure 24, as shown on the first page, may be applied by gluing or other suitable fastening means. The figure 24 is unclothed on the first page, and the preparation for the various stages of dressing follow on the successive pages.

The figure 24 as shown on the first page is duplicated on the successive pages, and is shown with its arms outspread and the legs separated so that the figure will not change in the successive stages, and the various articles of clothing may be shown in their conventional form and style.

On the second page of the book, designated by the numeral 25, the figure 24 is shown and a small mop of hair 26 is carried by the page over the figure at its head, to provide a mop of hair 26 with which the child or student may practice the use of the comb. A comb 27 is removably carried by the page 25 by providing a flexible or elastic strap 28 which is secured to the page adjacent the figure. The comb 27 is removably held against the page between the page itself and a portion of the strap. The ends of the strap 28 may be affixed to the page 25 by gluing, tacking or other suitable fastening means.

The mouth of the figure 24 is picturized partially open on the second sheet of the book and the teeth 29 are picturized between the parted lips. The teeth 29 may be drawn on the surface of the page 25 and are readily viewed through the open mouth of the figure. A toothbrush 30 is also carried by the page 25 adjacent the figure 24 thereon and is supported by a strap 31, the ends of which are secured on the page 25. The handle of the toothbrush is adapted to engage between the ends of the strap and between the strap 31 and the page 25. The comb 27 may be used on the mop of hair 26 by the student and by the teacher for teaching the student the proper use of the comb. The parted lips of the figure provide access for the brush portion of the toothbrush 30 for showing the student how the brush should properly be used.

A wash rag as 32 is carried by the page 25 for instructing and bringing to mind the necessary steps used in bathing. The wash rag 32 is loosely carried by the page 25 having one end thereof fixed to the page by gluing. That end of the rag 32 which is fixed to the page is preferably fixed at a point conforming to the position of one hand of the figure 24.

In Figure 4, the third page of the book is shown and indicated by the numeral 34. The figure 24 is fixed on the page 34 by the same manner as the figure was carried on the preceding pages. In Figure 4 the figure 24 is shown as partly dressed in pajamas and shoes. Portions of the pajamas 35 and 36 are fixed to the page 34 along the marginal edges of the garment sections 35 and 36. The garment portions 35 and 36 exemplify the front portions of a pair of pajamas or other article of bed clothing. The adjacent edges of the portions 35 and 36 are free from the page 34 and are secured together by buttons 37 carried by one clothing portion 35, engageable in buttonholes along the free edge of the adjacent garment section 36. Having the adjacent interengaging edges free, the operation of the buttons and their engagement in the buttonholes may be readily taught to the student, and this disposition of the garment provides an attractive background for the practicing of the student in the handling of this type of fastener.

Correlated ribbon sections as 38 and 39 are secured to the edges of figure 24 at what would be the waist of a person. One end of each of the ribbon sections 38 and 39 is fixed to the page 34 at the edge of the figure 24 below the outspread arms thereof. The ribbon sections 38 and 39 exemplify a belt about the night garment on the figure. The free ends of the belt portions 38 and 39 are such that they may be secured together by tying as in a bow or knot 40. This free disposition of the belt will provide ready access for practicing of the student in the task of properly tying bows and knots.

On the lower or foot portions of the figure 24 in Figure 4, broken away parts of a shoe are secured on the page 34 about their proper position in relation to the figure 24. The upper portion of a shoe designated by the correlated top sections 41 and 42 as broken away from a shoe along the connection to the sole thereof, are secured to the page 34 along the line which would ordinarily be secured to the sole of the completed shoe. The top sections 41 and 42 overlie the foot of the figure 24 and are free along their adjacent edges. The adjacent edges of the shoe members 41 and 42 are provided with shoe eyes or openings 44 within which a shoe-string 45 may be engaged. In Figure 4 one of the shoe portions is shown free of the shoestring 45 and the other shoe member is shown with the shoelace 45 contained or secured in the eyes 44 and with the ends of the lace properly tied.

In Figure 5 the fourth page of the book 20 is shown and the figure 24 is picturized as being clothed in underwear. The underwear garment designated generally by the numeral 46 is formed of an upper portion 47 and a lower portion or member 48. Each of the undergarment portions 47 and 48 are secured to the page 49 along the marginal edges on each side of the figure. The lower garment member 48 partially overlies the upper garment member 47 along its lower edge where the two sections are joined together by buttons 50 engaging in buttonholes 51. The buttons 50 are carried by the lowermost or underlying edge of the garment section 48. The adjacent or interengaging edges of the garment 46 are free from the page 49 so that the joining sections of the garment members 47 and 48 may be disengaged by the proper use of the buttons.

In Figure 6 the fifth page of the book 20 is shown, the page being designated generally by the numeral 52. The figure 24 on this page is depicted as being fully clothed for indoor wear. A lower garment section 54 is disposed about the lower portion of the figure 24 and an upper garment member 55 is fixed to the page 52 about the upper end of the figure 24. The lower and outer marginal edges of the lower garment section 54 are fixed to the page 52 by glue or other suitable fastening means, and the upper and opposite side edges of the upper garment member 55 are so fastened to the page. The upper edge of the lower garment member 54 overlies the lower edge of the upper garment member 55 where the two edges are secured together by snap fastening means 56.

The upper garment member 55 is formed of adjacent side portions for covering opposite sides of the figure 24. The side portions of this upper member are free from the page 52 and are secured together along their adjacent edges by a snap fastener 56 as is used for securing the lower garment member to the upper. The snap fastener 56 is formed with a resilient lug 57 which is carried by one section of the garment engageable in an opening in a plate 58 carried by the other garment member. While shoes are shown on the figure 24 on the fifth page of the book, these shoes may be designated only by drawing rather than by the actual figures or shoe members as described for the figure of page 4.

In Figure 7 the Teddy bear 24 is shown as clothed for outdoors. Adjacent outer garment sections 59 and 60 are carried by the figure 24 on this sixth page 61 of the book. The adjacent garment sections 59 and 60 are secured together along their adjacent edges by a zipper fastener, including a slider 62. Interengaging locking teeth 64 are carried by the adjacent edges of the garment members 59 and 60 and are engageable with each other by the operation or sliding movement of the slider 62 along the length of the interengaging members in the conventional manner.

In Figure 8 the Teddy bear 24 is shown as fully clothed for the outdoors and is provided with a pair of gloves 66. The gloves 66 are the conventional type gloves and are carried on the figure 24 by securing the back of the gloves to the page 67 in their proper relation to the outstretched hands. With the back of the gloves thus secure, the hand of the student may be inserted into the gloves, although the gloves may not be readily removed from the figure 24 or from the book.

With the use of this educational book 20, the various stages of dressing are shown to a student in their successive relation. While the separate garments used in the successive stages are not carried at any one place in the book altogether on one figure, the various figures exemplify the figure 24 as it would appear as clothed up to that stage which is pictured on the certain page at which the book is opened.

I do not mean to confine myself to the exact details of construction herein disclosed, but claim all variations falling within the purview of the appended claims.

What I claim is:

1. An educational toy comprising substantially rigid pages hingedly connected together along one edge thereof, a figure on each of said pages, said pages having portions of articles of clothing on said figure and correlated interengaging fastening means carried by the adjacent edges of said portions of clothing on each page for securing said portions together.

2. An educational toy comprising a book having a plurality of pages, a figure on each of said pages, a clothing element secured to certain of said pages about said figure, means securing the marginal edge of said clothing element to said page, and interengaging fastening means carried by said clothing element.

3. An educational toy comprising a book having a plurality of pages, a figure on each of said pages, fragmental clothing elements secured along the marginal edges thereof to each of said pages about said figure, and correlated interengaging fastening means carried by said fragmental clothing elements.

4. An educational toy comprising a book having a plurality of pages, a figure on each of said pages, fragmental clothing elements secured along the marginal edges thereof to each of said pages about said figure, in proper clothing relation thereto, and correlated interengaging fastening means carried by said fragmental clothing elements.

5. An educational toy comprising a book having a plurality of pages, a figure on each of said pages, fragmental clothing elements secured along the marginal edges thereof to said pages in proper relation to said figure, the clothing elements on successive pages embodying clothing elements of the successive stages of dressing, and fastening means for said clothing elements on each of said successive stages.

6. An educational toy comprising a book having a plurality of pages, a figure on each of said pages, fragmental clothing elements secured along the marginal edges thereof to certain of said pages in clothing relation to said figure, the clothing elements of the successive pages embodying clothing elements of the successive stages of dressing, and fastening means for said clothing elements of each of said successive stages, the clothing elements of each of said pages embodying fastening means peculiar to that style of clothing elements as differentiated from the fastening means of clothing elements of adjacent pages.

JUDY BELLAMY HOWELL.

REFERENCES CITED

The following references are of record in the file of this patent:

UNITED STATES PATENTS

| Number | Name | Date |
| --- | --- | --- |
| 1,509,548 | Fleischer | Sept. 23, 1924 |
| 1,519,934 | Ross | Dec. 16, 1924 |
| 1,767,090 | Miller | June 24, 1930 |
| 2,143,294 | Whiting | Jan. 10, 1939 |

OTHER REFERENCES

"The Montessori Method" by Maria Montessori; translated by Anne E. George; 6th ed.; Frederick A. Stokes Co., N. Y., 1912. Copy in Div. 53. Pages 145, 146 and illustrations facing pages 145, 200.